Patented Oct. 22, 1946

2,409,996

UNITED STATES PATENT OFFICE 2,409,996

ETHYLENE POLYMERIZATION

Milton J. Roedel, Talleyville, Del., assignor to E. I. du Pont de Nemours & Company, Wilmington, Del., a corporation of Delaware No Drawing. Application May 27, 1944, Serial No. 537,737

6 Claims. (Cl. 260—94)

The invention relates to improvements in the catalytic polymerization of ethylene.

It is known that ethylene can be polymerized with the aid of catalysts such as dialkyl dioxides, acyl peroxides, oxygen, chloramine T, manganese dioxide, amine oxides, tetraphenyl tin, tetraphenyllead, tetraethyllead, butyllithium, hexachloroethane, sodium perborate, sodium persulfate, potassium chlorate plus manganese dioxide, and hydrazine compounds. However, these catalysts with the exception of the dialkyl dioxides have many shortcomings. For instance, some catalysts may contaminate the ethylene polymer with an inorganic residue which impairs its excellent electrical properties and the heat-stability of the ethylene polymer, or it may give an ethylene polymer of limited solubility and melt extrudability. Furthermore, many of the above-mentioned catalysts produce ethylene polymers containing appreciable quantities of infusible, insoluble particles present in the main mass of the ethylene polymer. These cannot be removed readily by filtration and interfere with fiber and film fabrication. For convenience of expression, these particles have been designated by the term "grain." Of the catalytic materials mentioned above, dialkyl dioxides have been found particularly useful since they do not contaminate the ethylene polymer with an inorganic residue and do under selected polymerization conditions catalyze the formation of soluble and readily melt extrudable ethylene polymers. However, the synthesis of dialkyl dioxides is somewhat difficult, expensive, and hazardous.

It is the object of this invention to provide an efficient means of polymerizing ethylene to a high molecular weight polymer, free of inorganic contaminants and possessing excellent solubility and melt extrusion characteristics. Further objects and advantages of the invention will appear hereinafter.

Tough, orientable, high softening polymers of ethylene containing inappreciable quantities of grain and possessing excellent solubility and melt extrusion characteristics are prepared by the alkyl hydroperoxide-catalyzed polymerization of polymerization of ethylene in water, water plus an organic medium, or an organic medium as the polymerization medium at temperatures of 100–275° C. and ethylene pressures of 400 to 1000 atmospheres or above. The invention also contemplates the preparation of liquid to solid polymers of and from ethylene obtained in carrying on the polymerization at temperatures between 100° and 400° C. and at pressures between 50 and 3000 atmospheres and above.

By "alkyl hydroperoxide" is meant the monoalkyl derivative of hydrogen peroxide corresponding to the formula R—O—O—H, wherein R is a saturated monovalent open chain hydrocarbon radical.

As a rule, the amount of alkyl hydroperoxide will vary from about 0.0005% to about 2% of the total weight of monomers charged into the reaction vessel.

The polymerization of ethylene with an alkyl hydroperoxide can be carried out either as a batch, semi-continuous, or continuous operation, in which a suitable reaction vessel is charged with the catalyst and polymerization medium and heated under superatmospheric ethylene pressure until the desired degree of polymerization has been attained. Generally, the polymerization is conducted in vessels which are either constructed of or lined with stainless steel, silver, aluminum, mild steel, etc.

The examples which follow are intended to illustrate and not to limit this invention. Unless otherwise stated, the parts are by weight.

*Example 1.*—A stainless steel pressure reactor is flushed with oxygen-free nitrogen and is charged with 88 parts of anhydrous benzene and 0.25 part of a 62.2% solution of tertiary-butyl hydroperoxide in tertiary-butyl alcohol. This charge occupies about 25% of the volume of the reactor. After removal of the nitrogen by evacuation to constant pressure, the reactor is charged with ethylene to a pressure of 250 atmospheres and heated to 120° C. Upon reaching this temperature, the ethylene pressure is raised to 600 atmospheres and the polymerization is allowed to proceed with agitation for a 14 hour period. As the ethylene polymerizes, the system is kept between 550 and 600 atmospheres pressure by the addition of more ethylene. The total pressure drop is about 320 atmospheres. The reactor is cooled and the excess ethylene bled. There is obtained 42 parts of white solid ethylene polymer having an intrinsic viscosity of 1.12 (measured as a 0.125% solution in xylene at 85° C.) which corresponds to a molecular weight of about 19,500. This ethylene polymer is very tough, possessing a tensile strength of 2980 lbs./in.$^2$ at 580% elongation, contains only inappreciable quantities of grain, and is soluble to the extent of at least 30% by weight in xylene at 100° C. The polymer is readily extrudable, possessing an extrusion rate of 1.6 g./10 min./190° C./100 lbs. nitrogen pressure/1–16 inch orifice.

*Example 2* (N. B. 5198—p. 96).—A stainless steel pressure reactor is flushed with oxygen-free nitrogen and is charged with 78 parts of tertiary butyl alcohol and 0.64 part of a 64.6% solution of tertiary-butyl hydroperoxide in tertiary-butyl alcohol. This charge occupies about 25% of the volume of the reactor. After removal of the nitrogen by evacuation, the reactor is charged with ethylene to a pressure of 500 atmospheres and heated to 100° C. Upon reaching this temperature, the ethylene pressure is raised to 1005 atmospheres and the polymerization is allowed to proceed with agitation for a 14 hour period. As the ethylene polymerizes, the system is kept between 900 and 1000 atmospheres pressure by the addition of more ethylene. The reactor is then cooled and the excess ethylene bled. There is obtained 68 parts of white solid ethylene polymer having an intrinsic viscosity of 1.52 (measured as a 0.125% solution in xylene at 85° C.) which corresponds to a molecular weight of about 27,800.

*Example 3.*—A stainless steel pressure reactor is flushed with oxygen-free nitrogen and is charged with 100 parts of deoxygenated water and 0.17 part of a 62.2% solution of tertiary butyl hydroperoxide in tertiary butyl alcohol. This charge occupies about 25% of the volume of the reactor. After removal of the nitrogen by evacuation the reactor is charged with ethylene to a pressure of 400 atmospheres and heated to 125° C. Upon reaching this temperature, the ethylene pressure is raised to 950 atmospheres, and the polymerization is allowed to proceed with agitation for a 14 hour period. As the ethylene polymerizes, the system is kept between 850 and 950 atmospheres pressure by the addition of more ethylene. The reactor is then cooled and the excess ethylene bled. There is obtained 124 parts of a white solid ethylene polymer having an intrinsic viscosity of 1.66 (measured as a 0.125% solution in xylene at 85° C.) which corresponds to a molecular weight of about 30,400.

*Example 4.*—A stainless steel pressure reactor is flushed with oxygen-free nitrogen and is charged with 88 parts of benzene and 0.8 part of a 25% solution of ethyl hydroperoxide in water. This charge occupies about 25% of the volume of the reactor. After removal of the nitrogen by evacuation to constant pressure, the reactor is charged with ethylene to a pressure of 100 atmospheres and heated to 125° C. Upon reaching this temperature the ethylene pressure is raised to 600 atmospheres and the polymerization is allowed to proceed with agitation for an 18 hour period. As the ethylene polymerizes, the system is kept between 500 to 600 atmospheres pressure by the addition of more ethylene. The total pressure drop is about 410 atmospheres. The reactor is cooled and the excess ethylene bled. There is obtained 43 parts of a white, solid ethylene polymer having an intrinsic viscosity of 0.68 (measured as a 0.125% solution in xylene at 85° C.) which corresponds to a molecular weight of about 11,800.

The alkyl hydroperoxides are effective catalysts for ethylene polymerization at temperatures of 100° C. and above. By alkyl hydroperoxide is meant the monoalkyl derivative of hydrogen peroxide corresponding to the formula R—OOH, wherein R is a saturated monovalent hydrocarbon radical such as methyl, ethyl, propyl, isopropyl, normal butyl, secondary butyl, isobutyl, tertiary butyl, etc. Examples of such alkyl hydroperoxides are ethyl hydroperoxide, tertiary butyl hydroperoxide, and the like. Tertiary butyl hydroperoxide has been found especially useful because of the ease of preparation and handling of the catalyst. Furthermore, this particular alkyl hydroperoxide is commercially available. It is stable at ordinary temperatures and may be weighed or measured by volume and charged without trouble or hazard.

It is preferable to use as pure ethylene as is commercially feasible. In general, the process is operated under conditions such that the molecular oxygen content of the system based on the ethylene is less than 1000 parts per million, under 200 parts per million being preferred and under 10 parts per million giving outstanding products.

The polymerization may be carried out, in the absence of solvents or diluents, or in water, tertiary butyl alcohol, isooctane, benzene or other inert solvents.

The ethylene pressures used may vary from 400 atmospheres to 1000 atmospheres of ethylene or greater depending upon the temperature, polymerization factors, and limitations of the equipment. At the higher polymerization temperatures, higher ethylene pressures must be used if high molecular products are to be obtained since an increase in ethylene pressure increases the molecular weight of the ethylene polymer, whereas an increase in temperature decreases the molecular weight. These two polymerization variables are, therefore, adjusted to give an ethylene polymer possessing a molecular weight in the range desired for the contemplated use.

At low ethylene pressures, the ethylene polymers obtained are easily workable, low melt viscosity polymers useful for hot dip coating and impregnating purposes. At high ethylene pressures tough, soluble, extrudable, orientable ethylene polymers are obtained having physical properties especially suited for the fabrication of wrapping films and foils, oriented monofils and fibers, extruded rigid and collapsible tubing, protective coatings, calendered sheeting, cable insulation and other uses.

Ethylene copolymers can likewise be obtained using alkyl hydroperoxides as catalysts by introducing such compounds as acrylic and methacrylic esters, amides, and acids, vinyl acetate, styrene, acrylonitrile, vinyl chloride, vinylidene chloride, vinyl fluoride, tetrafluoroethylene, carbon monoxide, maleic anhydride, fumaric and maleic esters, butadiene, isoprene, 2-chlorobutadiene-1,3, vinyl imides, and like materials into the reactor before or during the polymerization.

I claim:

1. In a process involving the polymerization of ethylene at a temperature between 100 and 400° C. and a pressure between 400 and 3000 atmospheres, the step which comprises conducting the polymerization in the presence of from about 0.0005 to 2% of an alkyl hydroperoxide based on the total weight of monomers charged into the reactor.

2. In a process involving the preparation of tough, orientable, high softening polymers of ethylene at temperatures between 100 and 275° C. and pressures between 400 and 1000 atmospheres, the step which comprises conducting the polymerization in the presence of from about 0.0005 to about 2% of an alkyl hydroperoxide based on the total weight of ethylene.

3. A process which comprises polymerizing ethylene at a temperature between 100 and 400°

C., a pressure between 400 and 3000 atmospheres, in the presence of an inert, normally liquid organic medium and an alkyl hydroperoxide catalyst.

4. A process for the preparation of tough, orientable, high softening polymers of ethylene which comprises polymerizing ethylene at a temperature between 100 and 275° C. at a pressure between 400 and 1000 atmospheres, in the presence of benzene and an alkyl hydroperoxide catalyst.

5. A process for the preparation of tough, orientable, high softening polymers of ethylene which comprises polymerizing ethylene at a temperature between 100 and 275° C. at a pressure between 400 and 1000 atmospheres, in the presence of tertiary butyl alcohol and tertiary butyl hydroperoxide.

6. A process for the preparation of tough, orientable, high softening polymers of ethylene which comprises polymerizing ethylene at a temperature between 100 and 275° C. at a pressure between 400 and 1000 atmospheres, in the presence of benzene and tertiary butyl hydroperoxide.

MILTON J. ROEDEL.